(12) United States Patent
Imhof et al.

(10) Patent No.: US 12,510,580 B2
(45) Date of Patent: *Dec. 30, 2025

(54) ELECTROMETER WITH RADIO FREQUENCY (RF) TUNING WAVEGUIDE

(71) Applicant: NORTHROP GRUMMAN SYSTEMS CORPORATION, Falls Church, VA (US)

(72) Inventors: Eric A. Imhof, Albuquerque, NM (US); Steven Werner Geibel, Glenelg, MD (US); Steven Ryan Jefferts, Chatsworth, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/465,058

(22) Filed: Sep. 11, 2023

(65) Prior Publication Data

US 2024/0353462 A1 Oct. 24, 2024

Related U.S. Application Data

(60) Provisional application No. 63/406,971, filed on Sep. 15, 2022.

(51) Int. Cl.
*G01R 29/14* (2006.01)
*G01R 23/02* (2006.01)
*G01R 31/308* (2006.01)

(52) U.S. Cl.
CPC ............ *G01R 29/14* (2013.01); *G01R 23/02* (2013.01); *G01R 31/308* (2013.01)

(58) Field of Classification Search
CPC ........ G01R 23/02; G01R 29/14; G01R 31/28; G01R 31/308; G01R 1/00; G01R 3/00;
(Continued)

(56) References Cited

U.S. PATENT DOCUMENTS

2020/0292606 A1   9/2020   Holloway et al.
2021/0004846 A1   1/2021   Shariff et al.
(Continued)

OTHER PUBLICATIONS

WOISR (Written Opinion & International Search Report) for corresponding PCT/US2023/032488, mailed Jul. 31, 2024.

*Primary Examiner* — Judy Nguyen
*Assistant Examiner* — Brent J Andrews
(74) *Attorney, Agent, or Firm* — Tarolli, Sundheim, Covell & Tummino LLP

(57) ABSTRACT

One embodiment includes an electrometer system. The system includes a sensor cell comprising alkali metal atoms within and an optical beam system configured to provide at least one optical beam through the sensor cell to provide a Rydberg energy state of the alkali metal atoms, the at least one optical beam exiting the sensor cell as a detection beam. The system also includes a signal generator configured to generate a radio frequency (RF) tuning signal. The system also includes a waveguide extending along a length of the sensor cell, the waveguide being configured to propagate the RF tuning signal in the sensor cell to tune at least one energy state of the alkali metal atoms relative to the Rydberg energy state. The system further includes a detection system configured to monitor the detection beam to detect an external signal based on monitoring the detection beam.

19 Claims, 6 Drawing Sheets

(58) Field of Classification Search
CPC ... G01R 5/00; G01R 7/00; G01R 9/00; G01R 11/00; G01R 13/00; G01R 15/00; G01R 17/00; G01R 19/00; G01R 21/00; G01R 22/00; G01R 23/00; G01R 25/00; G01R 27/00; G01R 29/00; G01R 31/00; G01R 33/00; G01R 35/00

See application file for complete search history.

(56) References Cited

U.S. PATENT DOCUMENTS

| | | |
|---|---|---|
| 2021/0027088 A1 | 1/2021 | Dai |
| 2021/0048465 A1* | 2/2021 | Anderson .......... G01R 29/0878 |
| 2022/0196716 A1 | 6/2022 | Anderson et al. |
| 2022/0196718 A1* | 6/2022 | Walker ............... G01R 29/0885 |

* cited by examiner

ELECTROMETER WITH RADIO FREQUENCY (RF) TUNING WAVEGUIDE

RELATED APPLICATIONS

This application claims priority from U.S. Patent Application Ser. No. 63/406,971, filed 15 Sep. 2022, which is incorporated herein by reference in its entirety.

GOVERNMENT INTEREST

The invention was made under Government Contract. Therefore, the U.S. Government has rights to the invention as specified in that contract.

TECHNICAL FIELD

The present invention relates generally to sensor systems, and specifically to an electrometer with an RF tuning waveguide.

BACKGROUND

Electric field measurement via electrometers has many useful applications. Detectable electric fields can include DC electric fields, as well as AC electric fields (e.g., radio frequency (RF) fields which can correspond to communications signals). The detection of electric fields can be implemented for anti-spoofing and/or anti-jamming capability in electronic warfare environments. For example, if a jamming or spoofing signal can be detected, then the jamming signal or spoofing signal can be filtered or demodulated out to provide for a baseband signal of interest without undesired or adversarial interference. As an example, multiple antennas arranged in an array can provide for directional detection of a signal, such as to provide a detectable directional of a source of the signal.

SUMMARY

One embodiment includes an electrometer system. The system includes a sensor cell comprising alkali metal atoms within and an optical beam system configured to provide at least one optical beam through the sensor cell to provide a Rydberg energy state of the alkali metal atoms, the at least one optical beam exiting the sensor cell as a detection beam. The system also includes a signal generator configured to generate a radio frequency (RF) tuning signal. The system also includes a waveguide extending along a length of the sensor cell, the waveguide being configured to propagate the RF tuning signal in the sensor cell to tune at least one energy state of the alkali metal atoms relative to the Rydberg energy state. The system further includes a detection system configured to monitor the detection beam to detect an external signal based on monitoring the detection beam.

Another example includes a method for detecting an external signal via an electrometer system. The method includes providing a probe beam through a sensor cell comprising alkali metal atoms. The probe beam can exit the sensor cell as a detection beam. The method also includes providing a coupling beam through the sensor cell to excite the alkali metal atoms from a ground state to a Rydberg energy state of the alkali metal atoms based on the probe beam and the coupling beam. The method also includes providing an RF tuning signal through the sensor cell via a waveguide that extends along a length of the sensor cell to tune at least one energy state of the alkali metal atoms relative to the Rydberg energy state. The method further includes monitoring the detection beam to detect the external signal.

Another example includes an electrometer system. The system includes a sensor cell comprising alkali metal atoms within and a probe laser configured to generate a probe beam directed through the sensor cell in a first direction. The probe beam can exit the sensor cell as a detection beam. The system also includes a coupling laser configured to generate a coupling beam directed through the sensor cell collinearly and anti-parallel with the probe beam to provide a first Rydberg energy state of the alkali metal atoms. The system also includes a signal generator configured to generate an RF tuning signal and a waveguide extending within the sensor cell from a first end of the sensor cell through the sensor cell to a second end of the sensor cell opposite the first end. The waveguide can be configured to propagate the RF tuning signal in the sensor cell to tune the alkali metal atoms to a second Rydberg energy state. The system further includes a detection system configured to monitor the detection beam to detect an external signal based on monitoring the detection beam.

DETAILED DESCRIPTION

Figure 1:
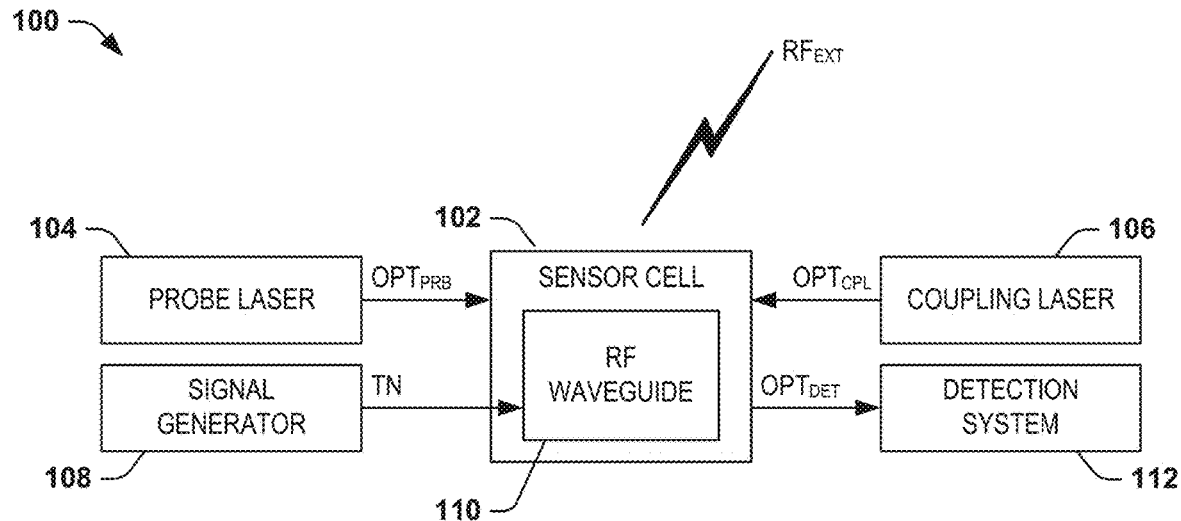
FIG. 1 illustrates an example diagram of an electrometer system.

The present invention relates generally to sensor systems, and specifically to an electrometer with an RF tuning waveguide. The electrometer system can include a sensor cell containing a vapor of alkali metal atoms enclosed within. The electrometer system also includes a probe laser and a coupling laser that are configured to generate a probe beam and a coupling beam, respectively. Each of the probe beam and the coupling beam can be provided through the sensor cell via a set of optics. The probe beam and coupling beams can take any mutually intersecting path through the sensor cell, including but not limited to paths in which the probe beam and the coupling beams are arranged collinearly and anti-parallel with each other. The probe beam may exit the sensor cell traveling in the opposite direction as the coupling beams. After exiting the sensor cell, the probe beam can be isolated and interrogated as a detection beam. The probe beam and the coupling beam can be tuned to respective frequencies and powers to excite certain atoms within the alkali metal vapor to a Rydberg energy state. The number and properties of atoms in this first Rydberg energy state can be determined by measuring the power and phase of the detection beam. For example, if the power of the detection beam plotted as a function of detection beam frequency, a peak of transmitted light can be detected for frequencies corresponding to the excitation of the Rydberg energy state.

The electrometer system also includes a signal generator configured to generate a tuning signal that is likewise provided through the sensor cell. As an example, the tuning signal can be provided as a radio frequency (RF) signal that is configured to shift or adjust an energy state of the alkali metal atoms. As an example, the tuning signal can be provided to generate a pair of mixed energy states that are associated with the Rydberg energy state (e.g., by being provided resonant with an energy difference between the Rydberg energy state and another Rydberg energy state). The mixed energy states can each be based on a combination of the Rydberg energy states (e.g., based on a sum and difference of the Rydberg energy states, as modified by a coefficient). The mixed energy states can correspond to a pair of Autler-Townes frequency-spectrum transparency peaks associated with the alkali metal atoms. Alternatively or additionally, the tuning signal can adjust an energy level of a given Rydberg energy state, such as to facilitate detection of an external signal. For example, the tuning signal can increase or decrease an energy level of one of the mixed energy states, or can increase or decrease an energy difference between the mixed energy states.

The electrometer system further includes a detection system configured to monitor the detection beam to detect an external signal. For example, the external signal can be detected based on the external signal having a frequency that is approximately equal to an energy difference between one of the Rydberg energy states and an adjusted energy state (e.g., of a mixed energy state or another Rydberg energy state). The detection system can include a photodetector that can monitor an intensity and/or phase of the detection beam. For example, the resonance of the tuning signal to the energy difference between the energy states can result in a change in Autler-Townes frequency-spectrum transparency peaks, which can thus be detected by the detection system.

As described above, the tuning signal can be provided to adjust the energy of Rydberg energy states and/or to generate mixed energy states to facilitate detection of the external signal. However, the amount of tuning exhibited upon the Rydberg energy states depends on the strength of the tuning signal at the location of the alkali metal atoms. As a result, non-uniformity of the tuning signal in the sensor cell can result in alkali metal atoms being tuned by different amounts depending on their position within the sensor cell. As a result, the frequency difference between the energy states of the alkali metal atoms can vary across the sensor cell. To mitigate the non-uniformity of the application of the tuning signal, the electrometer system includes a waveguide that extends through the sensor cell. The waveguide can propagate the tuning signal within the sensor cell, thus providing for a significantly more uniform application of the tuning signal to the alkali metal atoms. Accordingly, by providing the tuning signal on the waveguide through the sensor cell, as opposed to providing an RF signal external to the sensor cell, the electrometer can provide for more uniform tuning of the energy of the alkali metal atoms to detect the external signal more accurately.

FIG. 1 illustrates an example diagram of an electrometer system 100. The electrometer system 100 can be implemented in any of a variety of applications, such as to detect an external electromagnetic signal of any frequency (e.g., a radio frequency (RF) signal). In the example of FIG. 1, the external signal is demonstrated as $RF_{EXT}$.

The electrometer system 100 includes a sensor cell 102 that can be configured as a sealed glass container that includes a vapor of alkali metal atoms. As an example, the alkali metal vapor can be rubidium (Rb), or any of a variety of other types of alkali metals (e.g., cesium (Cs)). As described herein, the alkali metal vapor can be excited to a Rydberg energy state, such that the alkali metal vapor can be substantially insensitive to absorption of photons of light of a specific frequency (e.g., is approximately transparent). The electrometer system 100 also includes a probe laser 104 that is configured to generate a probe beam $OPT_{PRB}$ and a coupling laser 106 that is configured to generate a coupling beam $OPT_{CPL}$. As an example, each of the probe beam $OPT_{PRB}$ and the coupling beam $OPT_{CPL}$ can be provided through the sensor cell 102 via optics (not shown) in a manner such that the probe beam $OPT_{PRB}$ and the coupling beam $OPT_{CPL}$ can each be collimated (e.g., via optics) and provided collinearly and anti-parallel with respect to each other. However, other arrangements for providing intersection of the probe beam $OPT_{PRB}$ and the coupling beam $OPT_{CPL}$ for stimulating the alkali metal vapor to the Rydberg state can be provided instead.

As an example, the probe beam $OPT_{PRB}$ and the coupling beam $OPT_{CPL}$ can be tuned to respective frequencies to provide a Rydberg energy state of the alkali metal vapor, such that the alkali metal vapor is excited to populate the Rydberg energy state. While the example of FIG. 1 demonstrates a single coupling laser 106, multiple coupling lasers can be implemented to provide multiple respective coupling beams $OPT_{CPL}$ of differing frequencies to excite the alkali metal vapor to the first Rydberg energy state, as described herein. The probe beam $OPT_{PRB}$ can exit the sensor cell 102 as a detection beam $OPT_{DET}$.

The electrometer system 100 also includes a signal generator 108 configured to generate a tuning signal TN that is likewise provided to the sensor cell 102. As an example, the tuning signal TN can correspond to an RF signal having a defined frequency to adjust the energy level of the alkali metal atoms in the sensor cell 102. As an example, the tuning signal TN can be provided to generate a pair of mixed energy states that are associated with the Rydberg energy state (e.g., by being provided resonant with an energy difference between the Rydberg energy state and another Rydberg energy state). The mixed energy states can each be based on a combination of the Rydberg energy states (e.g., based on a sum and difference of the Rydberg energy states, as modified by a coefficient). The mixed energy states can correspond to a pair of Autler-Townes frequency-spectrum transparency peaks associated with the alkali metal atoms. Alternatively or additionally, the tuning signal can adjust an energy level of a given Rydberg energy state, such as to facilitate detection of the external signal $RF_{EXT}$. For example, the tuning signal TN can increase or decrease an energy level of one of the mixed energy states, or can increase or decrease an energy difference between the mixed energy states.

In the example of FIG. 1, the electrometer system 100 includes an RF waveguide 110 arranged in the sensor cell 102. The RF waveguide 110 is configured to propagate the tuning signal TN in the sensor cell 102. For example, the RF waveguide 110 can extend from a first end of the sensor cell 102 to a second end of the sensor cell 102 opposite the first end. The propagation of the tuning signal TN through the sensor cell 102 can therefore provide for a more uniform application of the tuning signal TN to the alkali metal atoms in the sensor cell 102, as described in greater detail herein. For example, the probe beam $OPT_{PRB}$ and the coupling beam $OPT_{CPL}$ can each be provided proximal to and parallel with the RF waveguide 110, such that the energy of the excited alkali metal atoms can be adjusted substantially uniformly.

While the RF waveguide 110 is described herein as being arranged within the sensor cell 102, the RF waveguide 110 could instead be arranged alongside the sensor cell 110, such as extending alongside approximately the entire length and proximal to the exterior of the sensor cell 102. Thus, in this manner, the tuning signal TN can likewise be provided uniformly to the excited alkali metal atoms in the sensor cell 102.

The electrometer system 100 further includes a detection system 112 that is configured to monitor the detection beam $OPT_{DET}$ to detect the external signal $RF_{EXT}$. The detection system 112 can include a photodetector that can monitor an intensity and/or phase of the detection beam $OPT_{DET}$. As described above, the mixed energy states provided by the tuning signal TN can provide a defined pair of Autler-Townes frequency-spectrum transparency peaks associated with the alkali metal atoms in response to the tuning signal TN having a frequency that is approximately equal to the energy difference between energy states. The detection system 112 can thus determine a change in the pair of Autler-Townes frequency-spectrum transparency peaks that correspond to the presence of the external signal $RF_{EXT}$.

As described above, the RF waveguide 110 can provide for a more uniform application of the tuning signal TN to the alkali metal atoms. The uniform application of the tuning signal TN can provide for the energy of the alkali metal atoms being adjusted uniformly through the sensor cell 102 to exhibit a more accurate detection of the external signal $RF_{EXT}$. Accordingly, implementing the RF waveguide 110 provides for a more improved signal detection relative to a typical electrometer that provides an RF tuning signal external to the associated sensor cell, which can exhibit non-uniformity of frequency of the RF tuning signal in the sensor cell.

Figure 2:
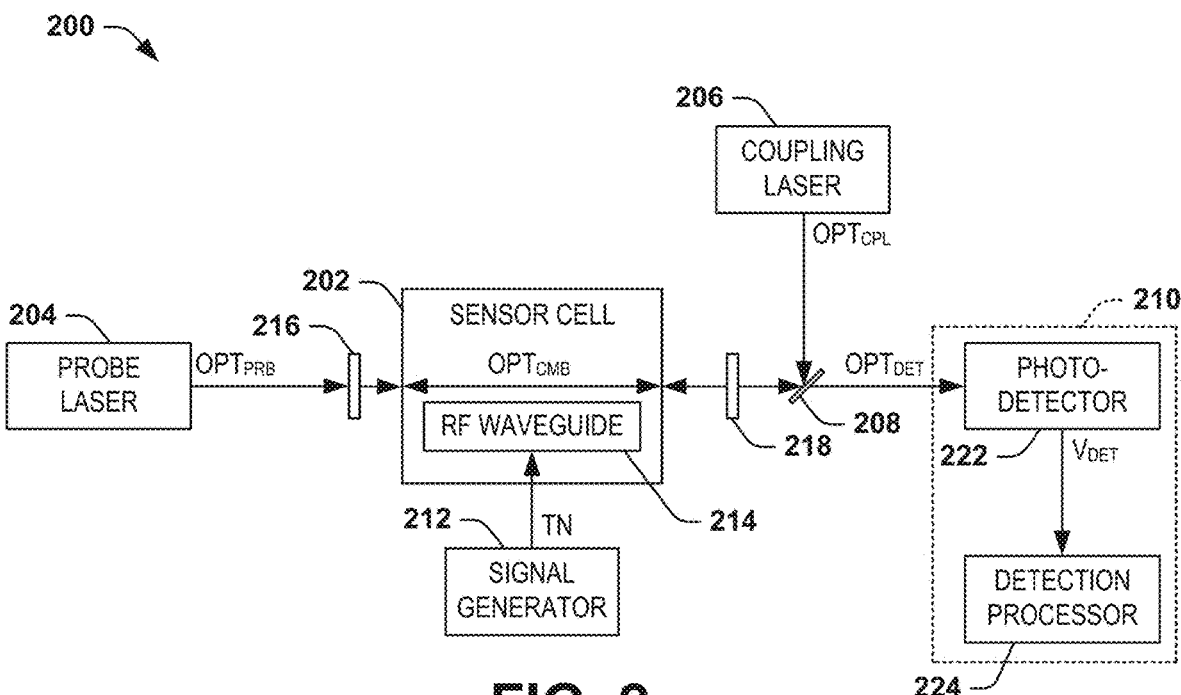
FIG. 2 illustrates another example diagram of an electrometer system.

FIG. 2 illustrates another example diagram of an electrometer system 200. The electrometer system 200 can be implemented in any of a variety of applications in which detection of an external signal $RF_{EXT}$ is desired.

The electrometer system 200 includes a sensor cell 202 that can be configured as a sealed glass container that includes an alkali metal vapor. The electrometer system 200 also includes a probe laser 204 that is configured to generate a probe beam $OPT_{PRB}$ and a coupling laser 206 that is configured to generate a coupling beam $OPT_{CPL}$. The probe beam $OPT_{PRB}$ is provided to the sensor cell 202. The coupling beam $OPT_{CPL}$ is provided to a dichroic mirror 208 that is configured to reflect the coupling beam $OPT_{CPL}$ into the sensor cell 202 and to pass the probe beam $OPT_{PRB}$ through the dichroic mirror 208 as a detection beam $OPT_{DET}$ that is monitored by a detection system 210. As described in greater detail herein, the probe beam $OPT_{PRB}$ and the coupling beam $OPT_{CPL}$ can be tuned to respective frequencies to provide a first Rydberg energy state of the alkali metal vapor. While the example of FIG. 2 demonstrates a single coupling laser 206, multiple coupling lasers can be implemented to provide multiple respective coupling beams $OPT_{CPL}$ of differing frequencies to excite the alkali metal vapor to the first Rydberg state, as described herein.

The electrometer system 200 also includes a signal generator 212 configured to generate a tuning signal TN. The tuning signal TN is provided to an RF waveguide 214 that is arranged in the sensor cell 202, such that the tuning signal TN propagates through the RF waveguide 214 through the sensor cell 202. The tuning signal TN can be selected to have a frequency that corresponds to an approximate energy difference between the first Rydberg energy state and a second Rydberg energy state, as described in greater detail herein.

Based on the arrangement of the dichroic mirror 208, the probe beam $OPT_{PRB}$ and the coupling beam $OPT_{CPL}$ can be provided through the sensor cell 202 in a manner such that the probe beam $OPT_{PRB}$, the coupling beam $OPT_{CPL}$ are collinear and anti-parallel with respect to each other, demonstrated in the example of FIG. 2 as a beam $OPT_{CMB}$. As an example, the beam $OPT_{CMB}$ can be provided parallel with and proximal to the RF waveguide 214, such that the alkali metal atoms that are excited by the beam $OPT_{CMB}$ can be energy tuned by the tuning signal TN in a substantially uniform manner, as described herein. Additionally, the electrometer system 200 includes collimating optics 216 (e.g., a lens) that can collimate the probe beam $OPT_{PRB}$ along a specific axis in the sensor cell 202, and collimating optics 218 (e.g., a lens) that can collimate the coupling beam $OPT_{CPL}$ along the specific axis in the sensor cell 202, such that the collimation of each of the probe beam $OPT_{PRB}$ and the coupling beam $OPT_{CPL}$ can be provided along the same axis in a collinear manner. Alternatively, the electrometer system 200 can include focusing optics to focus each of the probe beam $OPT_{PRB}$, the coupling beam $OPT_{CPL}$ to be collocated in the sensor cell 202 at a measurement point.

Figure 3:
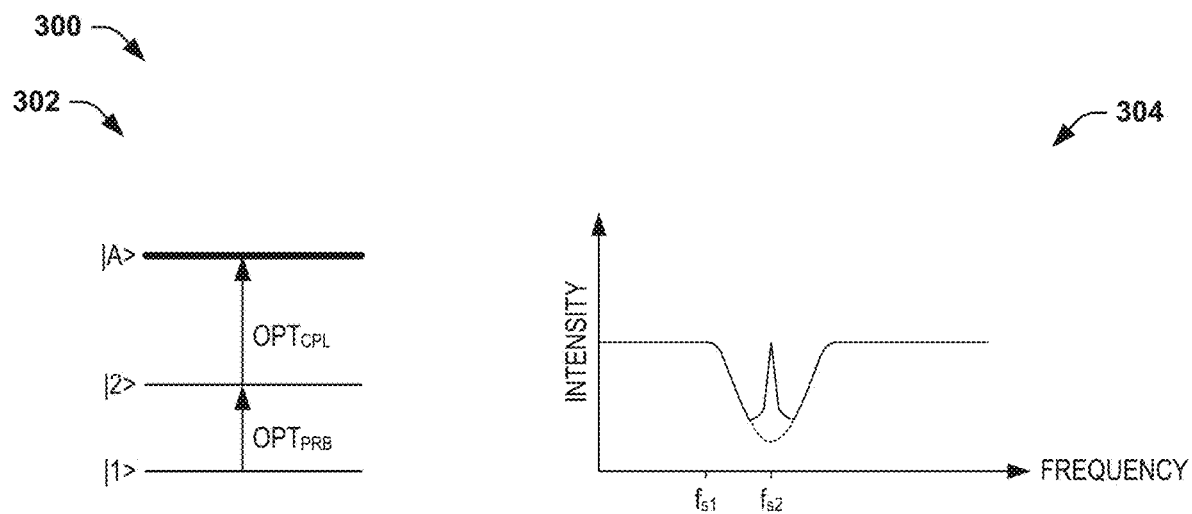
FIG. 3 illustrates an example diagram of optical detection.

FIG. 3 illustrates an example diagram 300 of optical detection. The diagram 300 includes an energy state diagram 302 and a graph 304 that demonstrates intensity of the detection beam $OPT_{DET}$ plotted as a function of frequency. The diagram 300 can correspond to optical detection in the electrometer system 200. Therefore, reference is to be made to the example of FIG. 2 in the following description of the example of FIG. 3.

The energy state diagram 302 demonstrates a first energy state (e.g., ground state) |1> at which the alkali metal atoms can begin. In response to the probe beam $OPT_{PRB}$, a population of the alkali metal atoms can be excited to a first excited state |2>. In response to the coupling beam $OPT_{CPL}$, a population of the excited alkali metal atoms can be further excited to a first Rydberg energy state |A>. Therefore, the alkali metal atoms in the first Rydberg energy state |A> can be transparent with respect to light at the approximate frequency of the probe beam $OPT_{PRB}$.

The graph 304 demonstrates that, at lower frequencies, the intensity of the detection beam $OPT_{DET}$ is at approximately 100%, corresponding to substantially no absorption of photons of the probe beam $OPT_{PRB}$ by the alkali metal vapor. The intensity begins to decrease at a frequency $f_{s1}$ to an absorption peak at a frequency $f_{s2}$ corresponding to maximum absorption of the photons of the probe beam $OPT_{PRB}$ by the alkali metal vapor, and thus a minimum intensity of the detection beam $OPT_{DET}$. The minimum intensity is demonstrated at an inverse peak dotted line in the example of FIG. 3, which would correspond to maximum absorption of the photons of the probe beam $OPT_{PRB}$ absent the coupling beam $OPT_{CPL}$. However, due to the coupling beam $OPT_{CPL}$, provided at a specific frequency and/or polarization with respect to the frequency of the probe beam $OPT_{PRB}$, the alkali metal vapor can experience a Rydberg transition, such that the alkali metal vapor can be substantially insensitive to absorption of the photons of the probe beam $OPT_{PRB}$ at the maximum absorption frequency $f_{s2}$. Therefore, the graph 304 demonstrates an intensity peak at the maximum absorption frequency $f_{s2}$.

Figure 4:
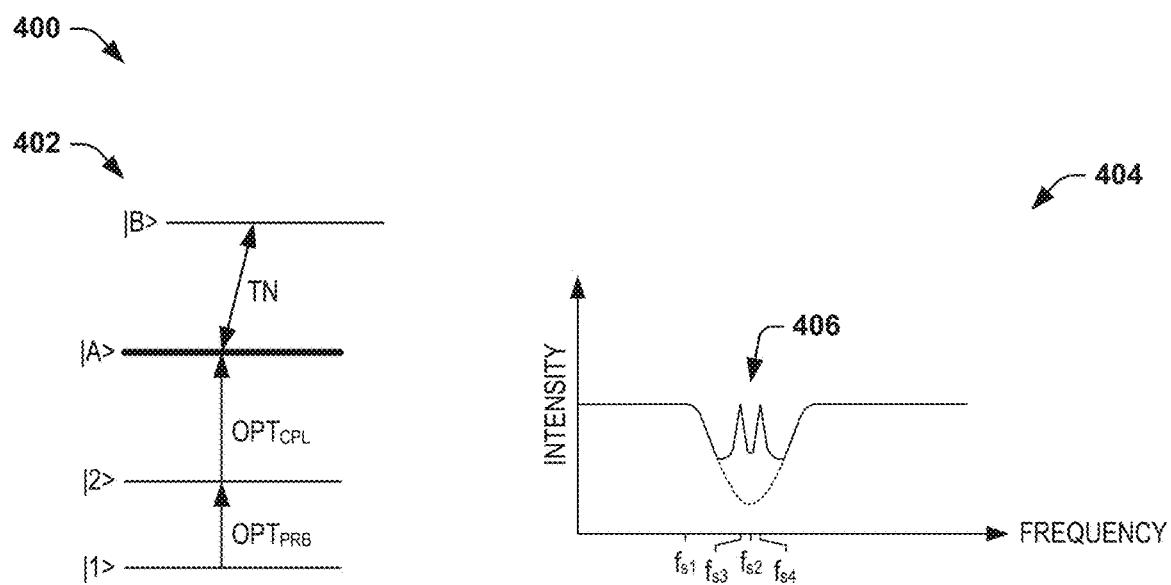
FIG. 4 illustrates another example diagram of optical detection.

FIG. 4 illustrates an example diagram 400 of optical detection. The diagram 400 includes an energy state diagram 402 and a graph 404 that demonstrates intensity of the detection beam $OPT_{DET}$ plotted as a function of frequency. The diagram 400 can correspond to optical detection in the electrometer system 200. Therefore, reference is to be made to the example of FIG. 2 in the following description of the example of FIG. 4.

The energy state diagram 402 is similar to the energy state diagram 302 in the example of FIG. 3. Particularly, the energy state diagram 402 demonstrates a first energy state (e.g., ground state) |1> at which the alkali metal atoms can begin. In response to the probe beam $OPT_{PRB}$, a population of the alkali metal atoms can be excited to a first excited state |2>. In response to the coupling beam $OPT_{CPL}$, a population of the excited alkali metal atoms can be further excited to a first Rydberg energy state |A>. Therefore, the alkali metal atoms in the first Rydberg energy state |A> can be transparent with respect to light at the approximate frequency of the probe beam $OPT_{PRB}$.

However, example of FIG. 4 demonstrates the inclusion of the tuning signal TN provided through the sensor cell 202 on the RF waveguide 214. In the example of FIG. 4, the tuning signal TN has a frequency that is approximately equal to an energy difference between the first Rydberg energy state |A> and a second Rydberg energy state |B>. As described above, the tuning signal TN can result in the creation of mixed energy states that can each be based on a combination of the first and second Rydberg energy states. In the graph 404, the mixed energy states result in Autler-Townes splitting of the transparency peak of the alkali metal atoms in the frequency spectrum. Thus, the transparency peak demonstrated in the graph 304 in the example of FIG. 3 is split into a pair of Autler-Townes transparency peaks, demonstrated at 406, based on the creation of mixed energy states resulting from the resonance of the tuning signal TN relative to the energy difference between the first and second Rydberg energy states |A> and |B>. As described herein, the Autler-Townes pair of transparency peaks in the frequency spectrum can be well defined and detectable.

The graph 404 plots an intensity of the detection beam $OPT_{DET}$ as a function of frequency. In the example of FIG. 4, the graph 404 demonstrates an intensity of approximately 100% of the intensity of the detection beam $OPT_{DET}$, and thus substantially no absorption of photons of the probe beam $OPT_{PRB}$ by the alkali metal vapor. The intensity begins to decrease at a frequency $f_{s1}$ to an absorption peak at a frequency $f_{s2}$ corresponding to maximum absorption of the photons of the probe beam $OPT_{PRB}$ by the alkali metal vapor, and thus a minimum intensity of the detection beam $OPT_{DET}$. The minimum intensity is demonstrated at an inverse peak dotted line in the example of FIG. 4, which would correspond to maximum absorption of the photons of the probe beam $OPT_{PRB}$ absent the coupling beam $OPT_{CPL}$. However, based on the interaction of the alkali metal vapor with the probe beam $OPT_{PRB}$, the coupling beam $OPT_{CPL}$, and the tuning signal TN, the alkali metal vapor can exhibit multi-photon transitions between the ground state |1> and either of the mixed energy states. Therefore, the alkali metal vapor can be substantially insensitive to absorption of the photons of the probe beam $OPT_{PRB}$ at each of two frequencies $f_{s3}$ and $f_{s4}$ that are approximately equal and opposite the maximum absorption frequency $f_{s2}$ on the frequency spectrum.

Referring back to the example of FIG. 2, the detection system 210 is configured to monitor the detection beam $OPT_{DET}$ to detect the external signal $RF_{EXT}$. In the example of FIG. 2, the detection system 210 includes a photodetector 222 (e.g., a photodiode) and a detection processor 224. The photodetector 222 can monitor the intensity and/or phase of the detection beam $OPT_{DET}$ and generate an electric signal, demonstrated in the example of FIG. 2 as a voltage $V_DET$ that corresponds to the intensity of the detection beam $OPT_{DET}$. As described above, the tuning signal TN can provide the pair of Autler-Townes frequency-spectrum transparency peaks 406 associated with the alkali metal atoms in response to the tuning signal TN having a frequency that is approximately equal to the energy difference between the first and second Rydberg energy states |A> and |B>.

The detection processor 224 can thus determine a change in the pair of Autler-Townes frequency-spectrum transparency peaks that correspond to the presence of the external signal $RF_{EXT}$. The detection processor 224 can thus determine characteristics associated with the external signal $RF_{EXT}$. As described above, non-uniformity of the tuning signal TN with respect to the excited alkali metal atoms can result in detuning of the mixed energy states that provide the Autler-Townes transparency peaks 406. As a result, non-uniformity of the tuning signal TN with respect to the excited alkali metal atoms can result in distortion of the Autler-Townes transparency peaks 406, thus providing potential errors in the detection of the external signal $RF_{EXT}$. However, by providing the RF waveguide 214 through the sensor cell 202, the tuning signal TN can be provided substantially uniformly with respect to the excited alkali metal atoms in the sensor cell 202. Accordingly, the Autler-Townes transparency peaks 406 can be provided in a stable and detectable manner for accurate detection of the external signal $RF_{EXT}$.

Figure 5:
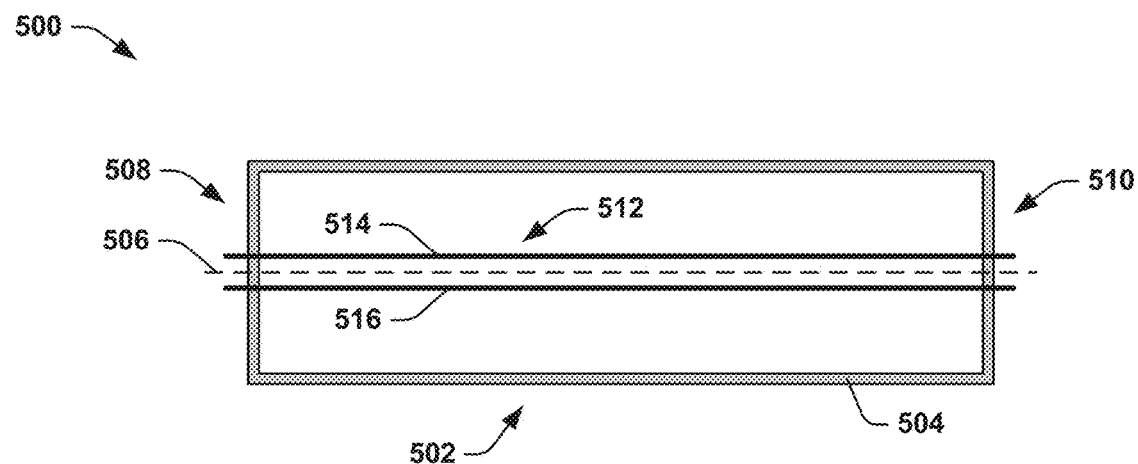
FIG. 5 illustrates an example diagram of a sensor cell.

FIG. 5 illustrates an example diagram 500 of a sensor cell 502. The sensor cell 502 is demonstrated in a cross-sectional view. The sensor cell 502 can correspond to the sensor cell 202 in the example of FIG. 2. Therefore, reference is to be made to the example of FIG. 2 in the following description of the example of FIG. 5.

The sensor cell 502 includes a transparent enclosure 504 that can be formed from a variety of transparent materials (e.g., glass). In the example of FIG. 5, the transparent enclosure 504 is arranged as a cylindrical tube having a circular cross-section relative to a central longitudinal axis 506. The transparent enclosure 504 thus includes a first end 508 and a second end 510 opposite the first end 508. In the example of FIG. 5, the sensor cell 502 includes an RF waveguide 512 that extends along the interior of the sensor cell 502 through the first end 508 and through the second end 510. The RF waveguide 512 is demonstrated as a twin-lead waveguide comprising a first lead 514 and a second lead 516.

As described above, the RF waveguide 512 is configured to propagate the tuning signal TN through the sensor cell 502. Therefore, in the example of FIG. 5, the tuning field TN can be localized to the region between the first and second leads 514 and 516. As an example, the first and second leads 514 and 516 can be arranged parallel with and offset equally and oppositely the longitudinal axis 506. As an example, the collinear and anti-parallel arrangement of the probe beam $OPT_{PRB}$ and the coupling beam $OPT_{CPL}$ can be provided between the first and second leads 514 and 516 (e.g., along the longitudinal axis 506). Therefore, the energy of the alkali metal atoms that are excited by the probe beam $OPT_{PRB}$ and the coupling beam $OPT_{CPL}$ can be uniformly adjusted by the tuning beam TN. As an example, the mitigate the effect of the endcaps of the sensor cell 502 on the propagation of the tuning signal TN on the RF waveguide 512, the thickness of the transparent enclosure 504 at the first end 508 and the second end 510 can be fabricated at approximately half the RF wavelength of the tuning signal TN.

Figure 6:
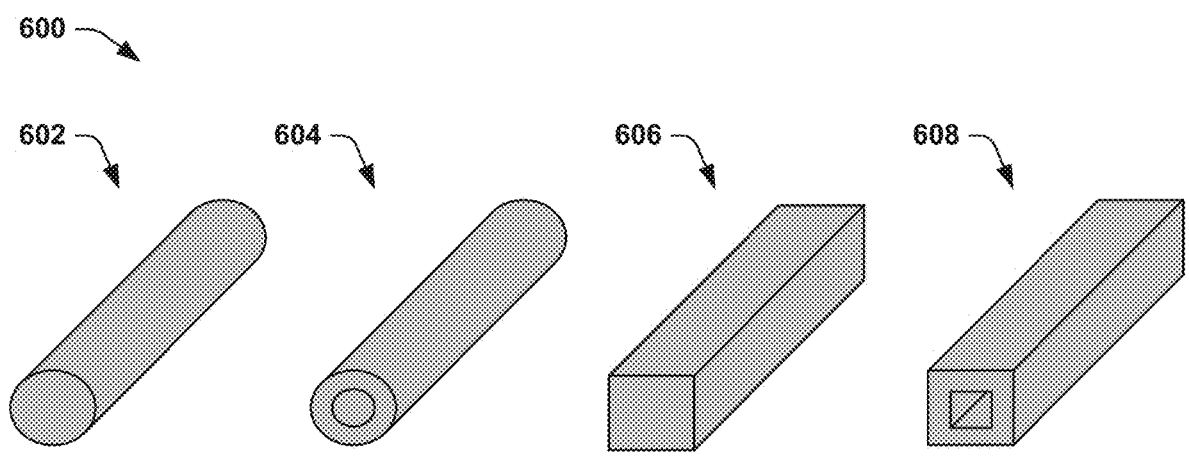
FIG. 6 illustrates an example diagram of waveguides.

Other types of RF waveguides can be implemented as the RF waveguide 214 as an alternative to the twin-lead waveguide 512. FIG. 6 illustrates an example diagram 600 of waveguides. The waveguides in the example of FIG. 6 can each correspond to an RF waveguide that can be implemented as the RF waveguide 214 that propagates the tuning signal TN. The diagram 600 includes a first waveguide 602, a second waveguide 604, a third waveguide 606, and a fourth waveguide 608. The first waveguide 602 is arranged as a cylindrical cross-section waveguide that has a solid core. The second waveguide 604 is arranged as a cylindrical cross-section waveguide that has a hollow core. The third waveguide 606 is arranged as a rectangular cross-section waveguide that has a solid core. The fourth waveguide 608 is arranged as a rectangular cross-section waveguide that has a hollow core.

As described above, the waveguides 602, 604, 606, and 608 are configured to propagate the tuning signal TN through the sensor cell 202. As an example, the waveguides 602, 604, 606, and 608 can be arranged parallel with the longitudinal axis of the sensor cell 202. As one example, the collinear and anti-parallel arrangement of the probe beam $OPT_{PRB}$ and the coupling beam $OPT_{CPL}$ can be provided proximal with and parallel to the waveguides 602, 604, 606, and 608. As another example, in the example of FIG. 6, the tuning field TN can be localized to the hollow region of the waveguides 604 and 608, such that the collinear and anti-parallel arrangement of the probe beam $OPT_{PRB}$ and the coupling beam $OPT_{CPL}$ can be provided in the hollow region of the waveguides 604 and 608. Therefore, the energy of the alkali metal atoms that are excited by the probe beam $OPT_{PRB}$ and the coupling beam $OPT_{CPL}$ can be uniformly adjusted by the tuning beam TN.

The waveguides 602, 604, 606, and 608 can each be arranged as dielectric waveguides. As an example, the waveguides 602, 604, 606, and 608 can each be formed of a dielectric material (e.g., glass or plastic) having a higher dielectric permittivity relative to a surrounding media (e.g., the alkali metal vapor in the sensor cell 202). By implementing a dielectric waveguide, the electrometer system 200 can have no metal in the sensor cell 202. As a result, external RF signals (e.g., including the external signal $RF_{EXT}$) do not interfere with or interact with the tuning signal TN, thereby mitigating noise or further RF interaction with the alkali metal atoms and/or the surrounding environment of the sensor cell 202. As a first example, the waveguides 602, 604, 606, and 608 can extend through the first and second ends of the associated sensor cell 202 to be provided through the sensor cell 202. As a second example, the waveguides 602, 604, 606, and 608 can be coupled to ports on the interior of the sensor cell 202, such that the separate waveguide portions can be coupled to exterior ports of the sensor cell 202. As an example, the mitigate the effect of the endcaps of the sensor cell 502 on the propagation of the tuning signal TN on the waveguides 602, 604, 606, and 608, the thickness of the enclosure at the ends of the sensor cell 202 can be fabricated at approximately half the RF wavelength of the tuning signal TN, similar to as described above in the example of FIG. 5.

Figure 7:
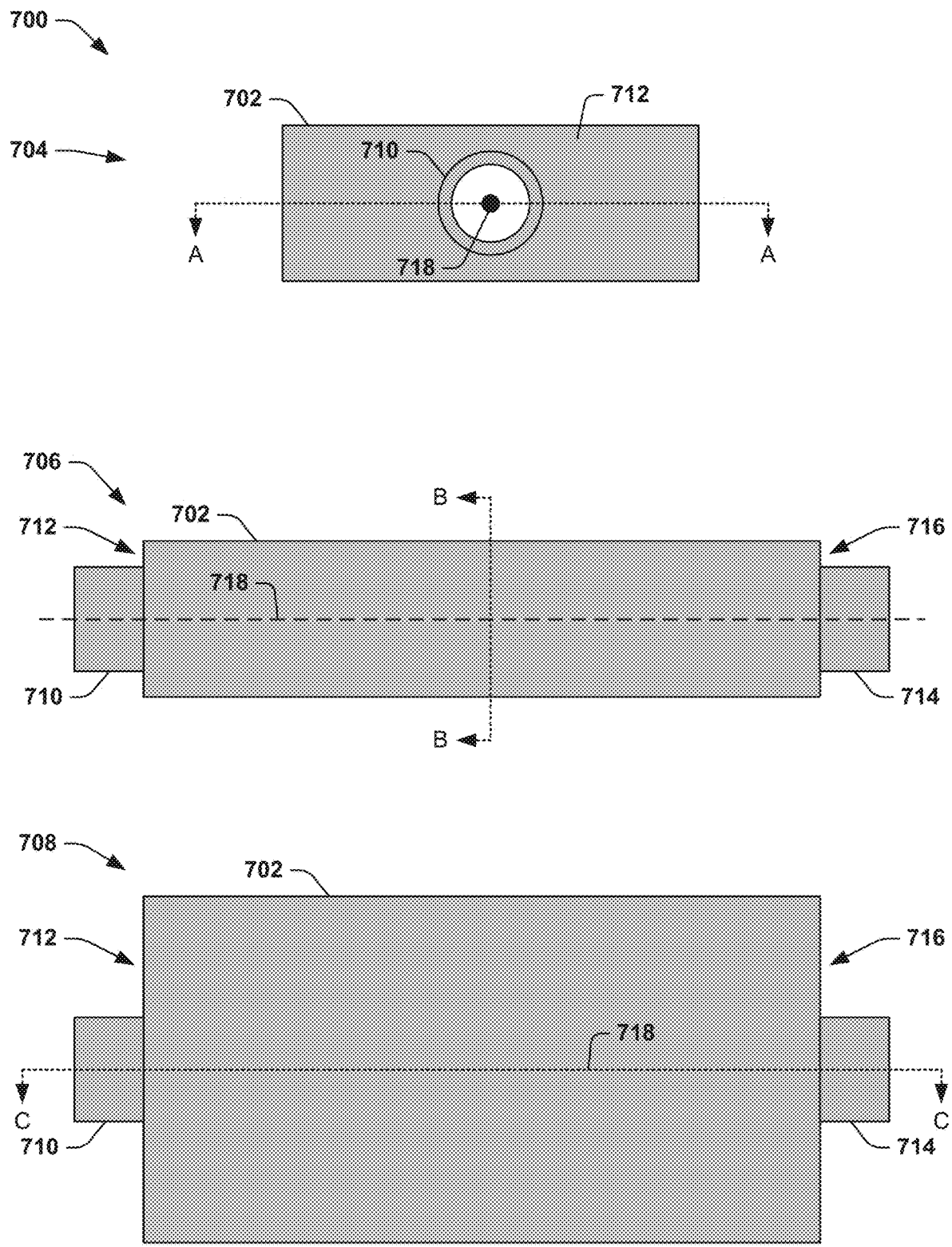
FIG. 7 illustrates another example diagram of a sensor cell.

As another example, the waveguides 602, 604, 606, and 608 can be fabricated as part of the sensor cell 202. FIG. 7 illustrates another example diagram 700 of a sensor cell 702. The sensor cell 702 is demonstrated in three orthogonal plan views, demonstrated in the example of FIG. 7 as a first view 704, a second view 706, and a third view 708 that correspond to respective X, Y, and Z-axis perspectives. The sensor cell 702 can correspond to the sensor cell 202 in the example of FIG. 2. Therefore, reference is to be made to the example of FIG. 2 in the following description of the example of FIG. 7.

The sensor cell 702 can be fabricated from a variety of materials, such as glass, to form a rectangular prism shape. The sensor cell 702 includes a first waveguide port 710 provided at a first end 712 of the sensor cell 702 and a second waveguide port 714 at a second end 716 of the sensor cell 702 opposite the first end 712. While the ports 710 and 714 are demonstrated in the example of FIG. 7 as protruding from the respective ends 712 and 716, the ports 710 and 714 could instead be fabricated flush with the respective ends 712 and 716. The ports 710 and 714 are aligned with and approximately centered on a longitudinal axis 718 that extends through the sensor cell 702. The ports 710 and 714 can thus be coupled to a dielectric waveguide that extends through an interior of the sensor cell 702 between the ports 710 and 714 along the longitudinal axis 718. In the example of FIG. 7, the ports 710 and 714, the waveguide therebetween, and the enclosure of the sensor cell 702 can all be fabricated of the same material in an integrated manner.

Figure 8:
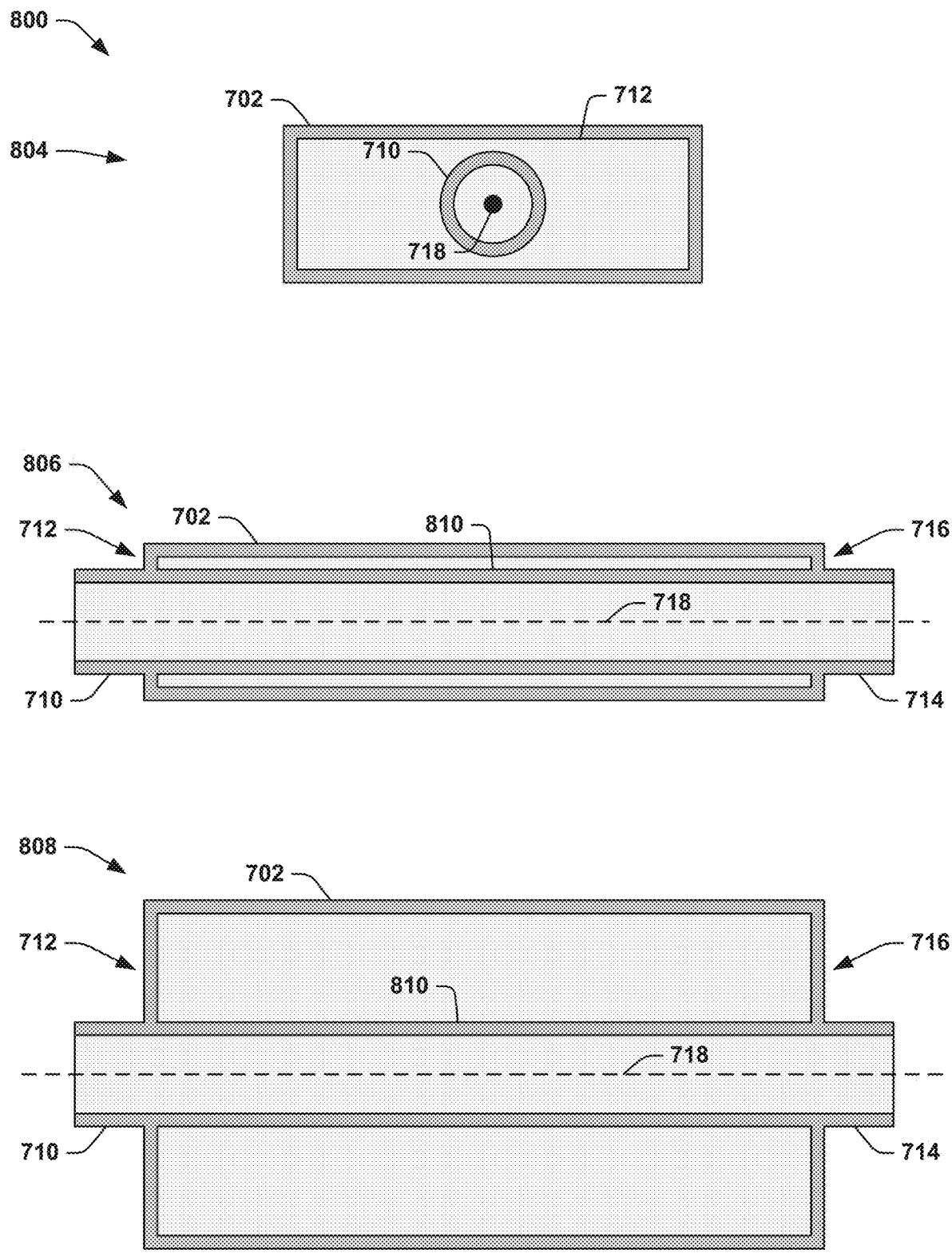
FIG. 8 illustrates yet another example diagram of a sensor cell.

FIG. 8 illustrates another example diagram 800 of the sensor cell 702. The sensor cell 702 is demonstrated in the example of FIG. 8 in three orthogonal cross-sectional views, demonstrated in the example of FIG. 8 as a first view 804, a second view 806, and a third view 808 that correspond to respective X, Y, and Z-axis perspectives. The sensor cell 702 can correspond to the sensor cell 202 in the example of FIG. 2. Therefore, reference is to be made to the example of FIGS. 2 and 7 in the following description of the example of FIG. 8.

The first view 804 is demonstrated as a cross-sectional view taken along "B" in the example of FIG. 7, the second view 806 is demonstrated as a cross-sectional view taken along "C" in the example of FIG. 7, and the third view 808 is demonstrated as a cross-sectional view taken along "A" in the example of FIG. 7. The views 804, 806, and 808 demonstrate the integral waveguide, demonstrated as a waveguide 810, extending through the sensor cell 702 between the first and second ends 712 and 716. In the example of FIG. 8, the ports 710 and 714, the waveguide 810, and the enclosure of the sensor cell 702 are all demonstrated as fabricated of the same material in an integrated manner. Therefore, the examples of FIGS. 7 and 8 demonstrate yet another manner of implementing a dielectric waveguide to propagate the tuning signal TN.

Figure 9:
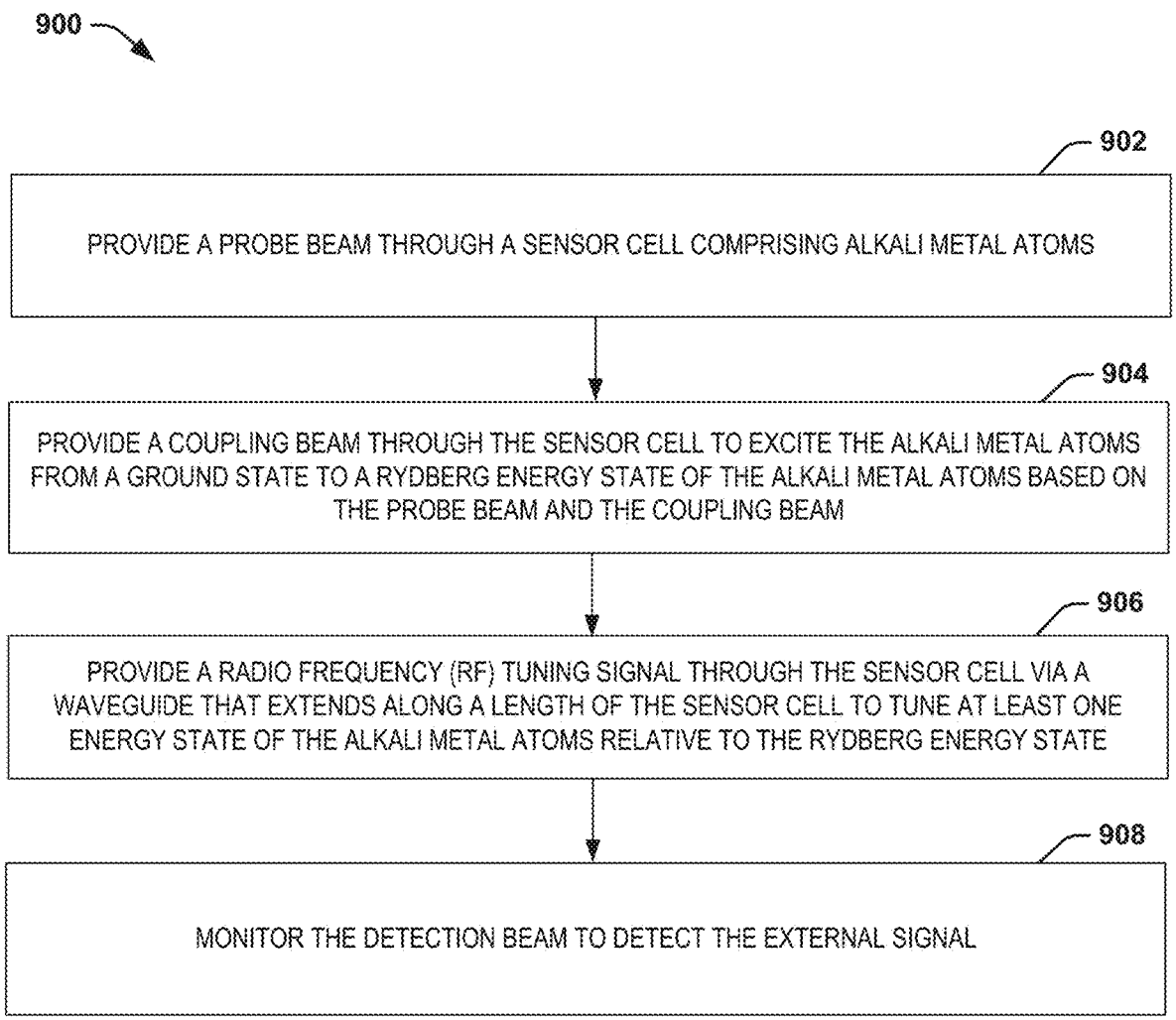
FIG. 9 illustrates an example of a method for detecting an external signal.

In view of the foregoing structural and functional features described above, a methodology in accordance with various aspects of the disclosure will be better appreciated with reference to FIG. 9. It is to be understood and appreciated that the method of FIG. 9 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 9 illustrates an example of a method 900 for detecting an external signal (e.g., the external signal $RF_{EXT}$) via an electrometer system (e.g., the electrometer system 100). At 902, a probe beam (e.g., the probe beam $OPT_{PRB}$) is provided through a sensor cell (e.g., the sensor cell 102) comprising alkali metal atoms. The probe beam can exit the sensor cell as a detection beam (e.g., the detection beam OPT$_{DET}$). At 904, a coupling beam (e.g., the coupling beam OPT$_{CPL}$) is provided through the sensor cell to excite the alkali metal atoms from a ground state to a Rydberg energy state (e.g., the Rydberg energy state |A>) of the alkali metal atoms based on the probe beam and the coupling beam. At 906, an RF tuning signal (e.g., the tuning signal TN) is provided through the sensor cell via a waveguide (e.g., the RF waveguide 110) that extends along a length of the sensor cell to tune at least one energy state of the alkali metal atoms relative to the Rydberg energy state. At 908, the detection beam is monitored to detect the external signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An electrometer system comprising:
   a sensor cell comprising alkali metal atoms within;
   an optical beam system configured to provide at least one optical beam through the sensor cell to provide a Rydberg energy state of the alkali metal atoms, the at least one optical beam exiting the sensor cell as a detection beam;
   a signal generator configured to generate a radio frequency (RF) tuning signal;
   a waveguide extending within a sensor cell and along a length of the sensor cell from a first end of the sensor cell through the sensor cell to a second end of the sensor cell opposite the first end, the waveguide being configured to propagate the RF tuning signal in the sensor cell to tune at least one energy state of the alkali metal atoms relative to the Rydberg energy state; and
   a detection system configured to monitor the detection beam to detect an external signal based on monitoring the detection beam.

2. The system of claim 1, wherein at least one of the at least one optical beam propagates parallel with the waveguide.

3. The system of claim 1, wherein the waveguide is configured as a twin-lead waveguide comprising a first lead and a second lead extending parallel with each other through the sensor cell.

4. The system of claim 3, wherein at least one of the at least one optical beam propagates parallel to and between the first and second leads.

5. The system of claim 1, wherein the waveguide is configured as a dielectric waveguide extending through the sensor cell.

6. The system of claim 5, wherein the dielectric waveguide is arranged as a hollow dielectric waveguide, wherein at least one of the at least one optical beam propagates through a hollow portion of the hollow dielectric waveguide.

7. The system of claim 5, wherein the dielectric waveguide is fabricated integral with the sensor cell.

8. The system of claim 1, wherein the waveguide extends along approximately an entire length of the sensor cell exterior to and proximal with the sensor cell, such that the waveguide is arrange parallel with a longitudinal axis of the sensor cell.

9. The system of claim 1, wherein the optical system comprises:
   a probe laser configured to generate a probe beam directed through the sensor cell in a first direction, the probe beam exiting the sensor cell as the detection beam; and
   a coupling laser configured to generate a coupling beam directed through the sensor cell collinearly and anti-parallel with the probe beam to provide the Rydberg energy state of the alkali metal atoms.

10. A method for detecting an external signal via an electrometer system, the method comprising:
    providing a probe beam through a sensor cell comprising alkali metal atoms, the probe beam exiting the sensor cell as a detection beam;
    providing a coupling beam through the sensor cell to excite the alkali metal atoms from a ground state to a Rydberg energy state of the alkali metal atoms based on the probe beam and the coupling beam;
    providing a radio frequency (RF) tuning signal through the sensor cell via a waveguide that extends within the sensor cell and along a length of the sensor cell from a first end of the sensor cell through the sensor cell to a second end of the sensor cell opposite the first end to tune at least one energy state of the alkali metal atoms relative to the Rydberg energy state; and
    monitoring the detection beam to detect the external signal.

11. The method of claim 10, wherein at least one of the probe beam and coupling beam propagates parallel with the waveguide.

12. The method of claim 11, wherein the waveguide is configured as a twin-lead waveguide comprising a first lead and a second lead extending parallel with each other through the sensor cell, wherein at least one of the at least one of the probe beam and coupling beam extends parallel and between the first and second leads.

13. The method of claim 11, wherein the waveguide is configured as a hollow dielectric waveguide fabricated integral with and extending through the sensor cell, wherein at least one of the at least one of the probe beam and coupling beam extends through a hollow portion of the hollow dielectric waveguide.

14. The method of claim 10, wherein the waveguide extends along approximately an entire length of the sensor cell exterior to and proximal with the sensor cell, such that the waveguide is arrange parallel with a longitudinal axis of the sensor cell.

15. An electrometer system comprising:
    a sensor cell comprising alkali metal atoms within;
    a probe laser configured to generate a probe beam directed through the sensor cell in a first direction, the probe beam exiting the sensor cell as a detection beam;
    a coupling laser configured to generate a coupling beam directed through the sensor cell collinearly and anti-parallel with the probe beam to provide a first Rydberg energy state of the alkali metal atoms;
    a signal generator configured to generate a radio frequency (RF) tuning signal;
    a waveguide extending within the sensor cell from a first end of the sensor cell through the sensor cell to a second end of the sensor cell opposite the first end, the waveguide being configured to propagate the RF tuning signal in the sensor cell to tune the alkali metal atoms to a second Rydberg energy state; and a detection system configured to monitor the detection beam to detect an external signal based on monitoring the detection beam.

16. The system of claim 15, wherein the probe beam and the coupling beam each propagate parallel with the waveguide.

17. The system of claim 15, wherein the waveguide is configured as a twin-lead waveguide comprising a first lead and a second lead extending parallel with each other through the sensor cell, wherein each of the probe beam and the coupling beam propagate parallel to and between the first and second leads.

18. The system of claim 15, wherein the waveguide is configured as a hollow dielectric waveguide, wherein each of the probe beam and the coupling beam propagate through a hollow portion of the hollow dielectric waveguide.

19. The system of claim 18, wherein the hollow dielectric waveguide is fabricated integral with the sensor cell.

* * * * *